April 8, 1969 D. D. HARMON 3,437,447
AUTOMATIC LIQUID MIXING APPARATUS
Filed April 8, 1966 Sheet 5 of 5

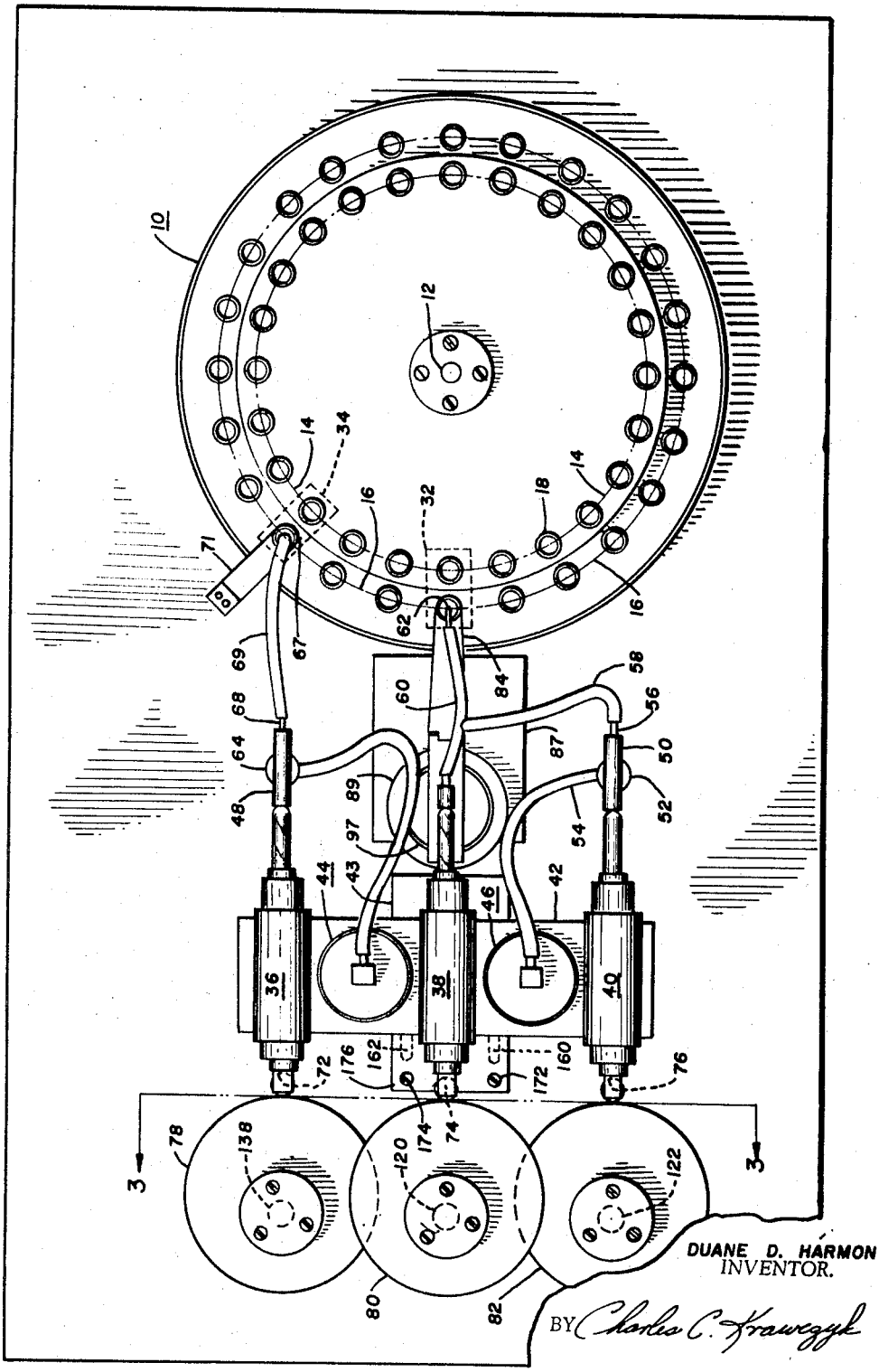

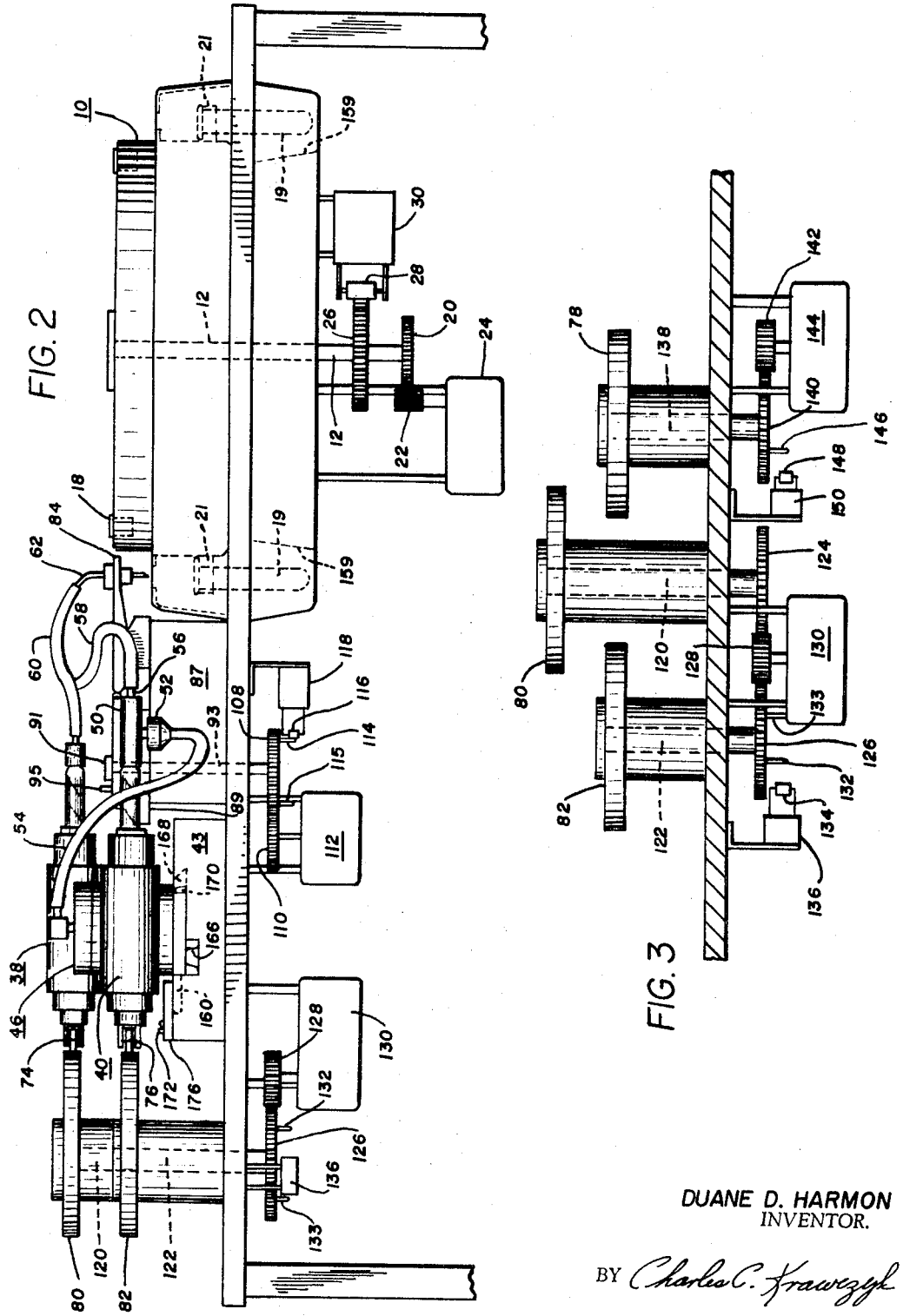

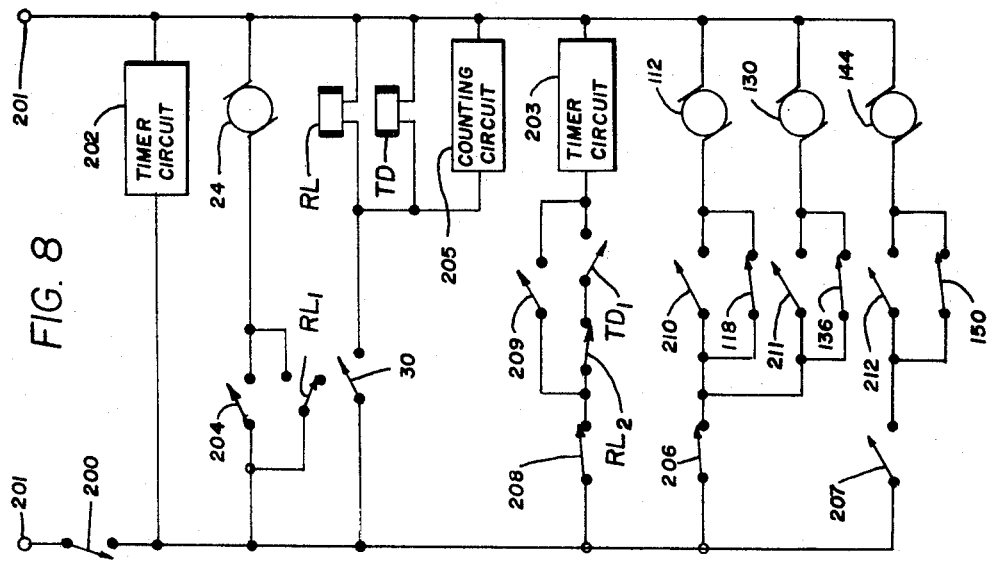
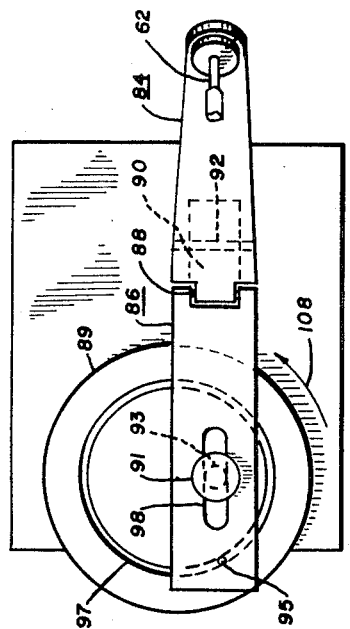
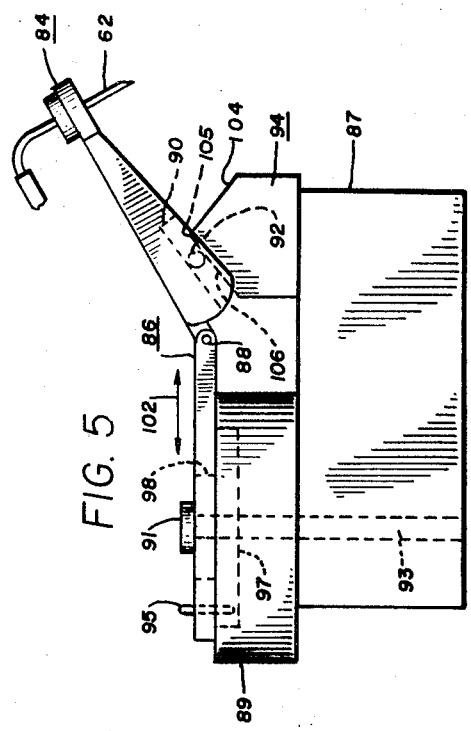

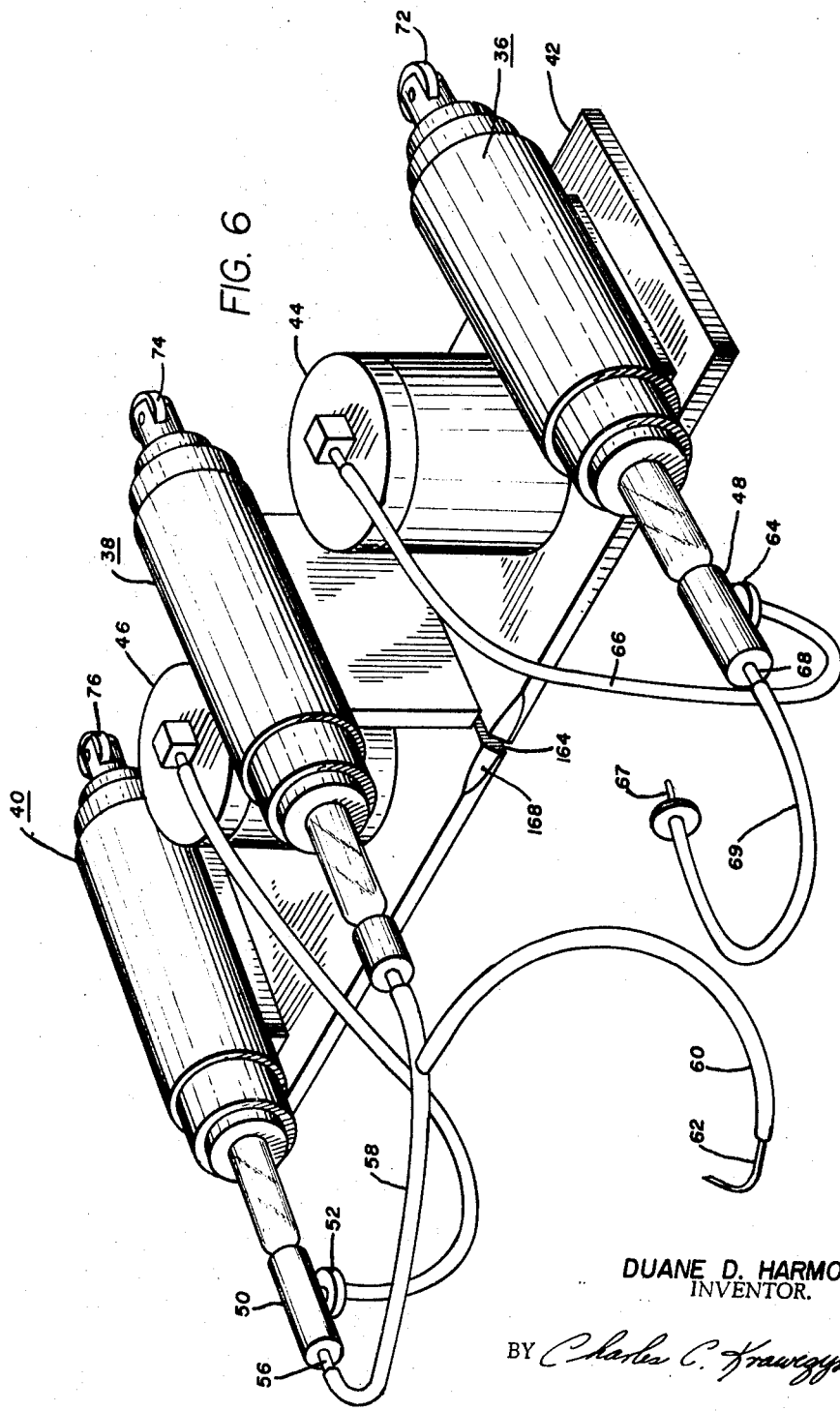

DUANE D. HARMON
INVENTOR.

BY Charles C. Krawczyk

ATTORNEY

United States Patent Office 3,437,447
Patented Apr. 8, 1969

3,437,447
AUTOMATIC LIQUID MIXING APPARATUS
Duane D. Harmon, Irondequoit, N.Y., assignor to Bausch & Lomb Incorporated, Rochester, N.Y., a corporation of New York
Filed Apr. 8, 1966, Ser. No. 541,288
Int. Cl. G01n 33/16, 31/14
U.S. Cl. 23—253
8 Claims

ABSTRACT OF THE DISCLOSURE

A modular type pumping unit wherein a preset pump, a reservoir and interconnections are mounted on a readily disconnectable base that can be inserted into or removed from a liquid mixing system as a preset modular unit.

---

The present invention relates, in general, to automatic feed apparatus, and, in particular to a device for supplying a plurality of liquid samples to an analyzing system.

In certain types of analytical procedures, large numbers of routine determinations must be carried out. Particularly applicable are those employed in biochemical, physiological and medical laboratories where materials such as bood serum, tissue serum, urine, or other materials are tested and/or anlayzed. Such tests are particularly suited for automation because the analytical procedures are repeated a large number of times.

In accordance with many of these procedures, the final measurement is made by a suitable sensing device capable of measuring a physical or chemical property which is indicative of the analytical results to be found. For example, many procedures call for the mixing of reagents which develop a change in optical density in an amount depending upon the concentration of a constituent in the sample. When the apparatus is to be fully automated and to be programmed to carry out such a procedure, it is necessary to provide means for mixing the reagents in accurately predetermined amounts so that it may be sequentially positioned into an operative position with respect to the sensing device in an orderly and known fashion.

In the presently available mixing apparatus, a good deal of down time is spent in the initial set-up of the apparatus each time a group of tests are to be made. For example, if a new set of reagents are to be mixed, the pumps, plumbing, valves, etc. must be rinsed, adjustments must be made on the apparatus to arrange for changes in the mixing volume, the reservoirs refilled, etc. In addition to the foregoing, the reagents may be of the type that lose their effectiveness if exposed to room temperature for any extended period of time (such as overnight). In such cases, the apparatus (pump, reservoirs, plumbing etc.) must be reloaded (including rinsing etc.) each time a new group of tests are made.

It is therefore an object of this invention to provide a new and improved fluid mixing apparatus.

It is also an object of this invention to provide a new and improved fluid mixing apparatus that is readily replaceable as a unit.

It is still a further object of this invention to provide a new and improved preset fluid mixing apparatus that is adapted to be readily replaceable as a unit so that a unit can be changed, reloaded etc. while the instrument receiving such units is in operation with another.

In accordance with the invention, a mixing system or apparatus is provided that is adapted to be used in conjunction with automatic positioning apparatus including a plurality of first containers and a plurality of second containers movable along a preset path. The first containers are adapted to receive a liquid test sample. The apparatus of the invention automatically translates at least a portion of a liquid test sample and at least one reagent to the second containers in synchronization with the movement of the containers. A transfer device, adapted to receive a probe is movably mounted adjacent the preset path to move to a first operative position with respect to the first containers for withdrawing at least a portion of the liquid reagent therein and to a second operative position with respect to said second containers for delivery of a liquid thereto. Preset pump means are detachably coupled to the transfer device operable to take up a measured quantity of liquid test sample from a first container when the transfer device is in the first operative position and deliver the liquid test sample along with a measured quantity of another reagent to the second container when the transfer device is in the second operative position. The pump means are mounted for easy removal from that apparatus as a unit so that a number of such units can be readily interchangeable. With such interchangeable units, individual units can be cleaned, filled, stored etc. while other similar units are in operation.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

FIGURE 1 is a plan view embodiment of an instrument embodying the liquid mixing apparatus of the invention.

FIGURE 2 is a side view of the instrument of FIGURE 1.

FIGURE 3 is a cross sectional view of a portion of the apparatus of FIGURE 1 taken along the line 3—3.

FIGURE 4 is a top view of the probe cycling means of FIGURE 1.

FIGURE 5 is a side view of FIGURE 4.

FIGURE 6 is a perspective view of the pumps, reservoir and intercoupling coupling of FIGURE 1 as a detachable unit.

FIGURE 8 is a schematic diagram of an electrical circuit for synchronizing the operation of the instrument of FIGURE 1.

Figure 7:
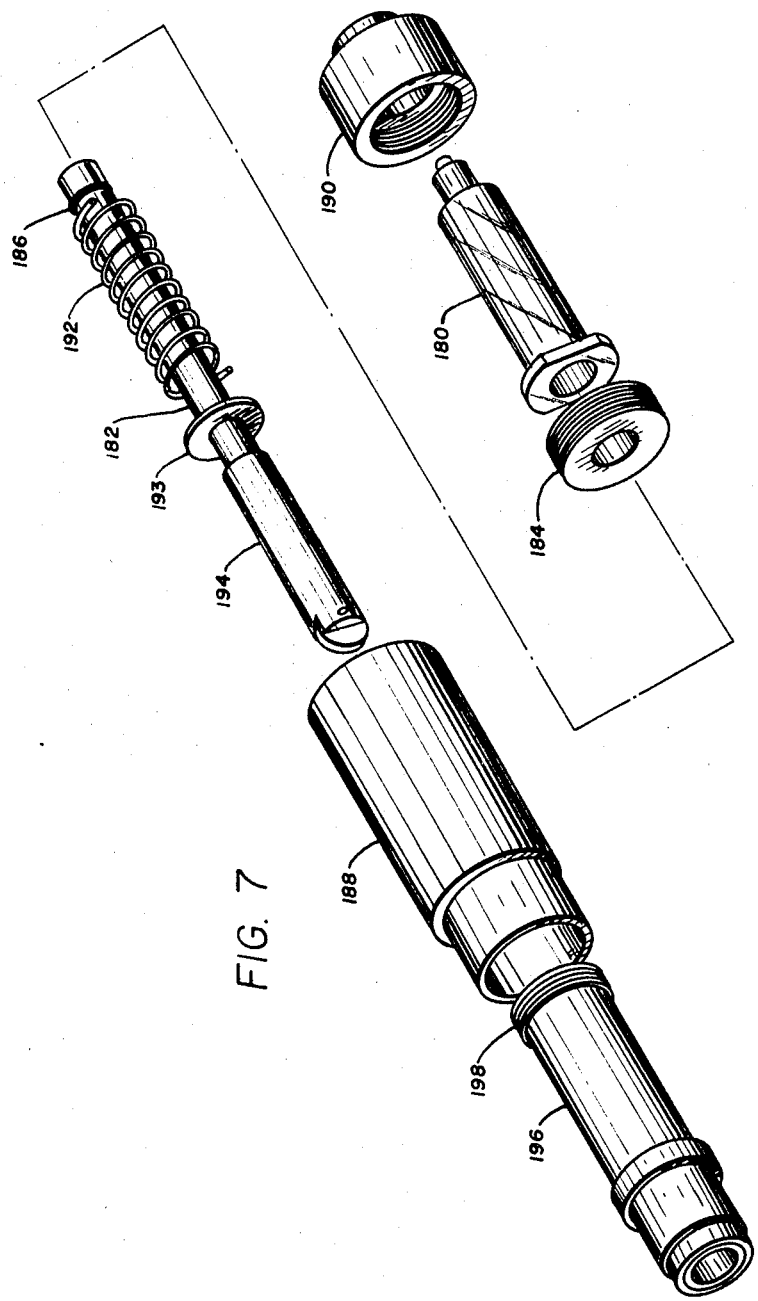
FIGURE 7 is an exploded view of a pump of FIGURE 1.

Referring now to the FIGURES 1 and 2 an automatic positioning system is illustrated that is adapted to be used in conjunction with the fluid mixing apparatus including the invention. The postioning system includes a circular turntable 10 mounted to rotate about a shaft 12. Two groups of holes are formed in concentric circular rows 14 and 16 about the shaft 12. The holes in the circular row 14 are adapted to receive a plurality of small sample cups 18 including test samples to be analyzed. The holes in the circular row 16 are in fixed radial relation with the cups 18 in row 14 and provide openings to a plurality of cuvettes 19 (one for each cup 18) mounted by a spring clip 21 to rotate with the turntable 10. The cuvettes 19 are adapted to receive a portion of test samples mixed with a plurality of reagents.

The turntable shaft 12 is coupled through the gears 20 and 22 to a motor 24 (FIGURE 2). A timing gear 26 is also coupled to the shaft 12, the teeth of which are adapted to engage the roller 28 of a snap action switch 30, to provide an indication when the turntable 10 has rotated a preset angle. The motor 24, by way of example, can be a commercially available slow speed motor that can be energized momentarily to close the switch 30 and then held energized (sealed in) by the switch 30 until the turntable has rotated a required angle. Each time the motor 24 is energized a new sample cup 18 and cuvette 19 are positioned in a loading site 32 and also in a sensing site 34. The loading and sensing sites are illustrated by dashed blocks. The sensing site 34 may for example include means for applying a beam of radiation through a cuvette 19 (positioned in the sensing site) to a radiation sensitive device for measuring the optical density of the mixture in the cuvette.

Two reagents and a test sample are automatically and sequentially translated into the cuvettes 19 in the present embodiment through the use of three pumps 36, 38 and 40. The pumps 36–40 are a cyclic type that are adapted to translate a given volume of liquid for a cycle of operation in a manner that will be fully explained at a latter portion of the specification. The three pumps 36–40 are illustrated as being mounted along with two reagent reservoirs 44 and 46 on a common base 42. The base 42 is detachably mounted, in a manner fully explained in a later portion of the specification, to a base 43. The pumps 36 and 40 include the two way valves 48 and 50 respectively. The input port 52 of the valve 50 is coupled through a flexible tube 54 to the reservoir 46 while the output port 56 is coupled through the flexible tubes 58 and 60 to a detachable probe 62. The tube 60 is also coupled to the pump 38. The input port 64 of the valve 48 is coupled through a flexible tube 66 to the reservoir 44 while the output port 68 is coupled through the flexible tube 69 to a probe 67 (FIGURE 6) which is detachably mounted to a bracket 71 (FIGURE 1) above a hole in the circular row 16 positioned at the sensing site 34. The pumps 36, 38 and 40 are coupled through the rollers 72, 74 and 76 respectively to urge against the rotatable cams 78, 80 and 82 respectively for actuation or cycling thereof.

Referring now to FIGURES 4 and 5, the probe 62 is detachably mounted to form a portion of an automatic sampling mechanism or transfer device for removing a preset volume of the test sample from the cups 18 and translating the preset volume of the test sample along with a given volume of reagent from the reservoir 46 into a corresponding cuvette 19 in the loading site 32. Probe 62 is a hollow tube extending through a movable probe arm 84. The movable arm 84 is pivotally coupled to a sliding member 86 through a pivot connection 88 and includes an elongated guide slot 90 formed therein with a pin 92 extending across the slot. The guide slot 90 fits over a stationary cam 94 having a triangular shaped surface that engages the pin 92 to control the vertical motion of the arm 84.

The slidable member 86 is mounted on a circular cam 89 through a cam 89 drive shaft 93 (down dashed) and held in place by a cap 91. The cam 89 includes a circular groove 97 formed eccentric with the drive shaft 93 (shown dashed). A guide pin 95 extends through the slidable member 86 into the circular groove 97. The shaft 93 passes through a solt 98 formed in the slidable member 86 and extends through and makes connection with the cam 89 at a point off center.

The cam 89 is rotated by the shaft 93 to slide along the base 87 in a counterclockwise direction (as indicated by the arrow 108) so that the slidable member 86 slides back and forth (in the direction as indicated by the arrows 102) causing the pin 92 to ride along the surfaces 104 and 106 of the stationary cam 94 and causing the arm 84 to follow a path having the form of an arc. For example, if the arm 84 is forced to move in a direction towards the turntable 10, the pin 92 rides up along the surface 106 causing the arm 84 to tilt upwards above the cups 18 in circular row 14. After the pin has passed the peak 105 in the cam 94 (with the arm still moving in the same direction) the pin 92 slides along the surface 104 causing the arm to be tilted down toward the turntable 10 so that the probe 62 dips into a sample cup 18 in the loading site 32 providing a first operative position for withdrawing the test sample. As the cam 89 is rotated further, the direction of movement of the slider 86 and the arm 84 reverses, forcing the pin 92 to slide back up the surface 104 tilting the arm 84 up away from the turntable 10 and over the peak 105 onto the surface 106. While returning over the surface 106 the arm 84 tilts back down towards the turntable 10 so that the probe 62 extends over the corresponding opening in the circle 16 in the loading site 32 providing a second operative position for delivery of a liquid to a cuvette 19. The cam shaft 93 is coupled through the gears 108 and 110 to a drive motor 112 (FIGURE 2). Two pins 114 and 115 are mounted on the gear 108 to engage a roller 116 of a snap action switch 118 to provide a signal when a half revolution of the cam 89 has been completed.

Referring now to FIGURES 2 and 3 the cams 80 and 82 are coupled through the shafts 120 and 122 respectively, and the gears 124 and 126 respectively, to a common gear 128 mounted on a shaft of a drive motor 130. Two pins 132 and 133 are mounted on the gear 126 and are adapted to engage a roller 134 of a snap action switch 136 to signal one half a rotation of the cams 80 and 82. The cam 78 is coupled through a shaft 138 and a pair of gears 140 and 142 to a shaft of a motor 144. The gear 140 includes a pin 146 that is adapted to engage the roller 148 of a snap action switch 150 to provide a signal when a rotation of the cam 78 is complete. The motors 112, 130 and 144 can also be commercially available slow speed motors.

The motors 112 and 130 are adapted to be energized when a new group (including a test sample in cup 18 and a cuvette 19) are rotated into the loading site 32, and the motor 144 when a cuvette 19 including a test sample and reagent is rotated into the sensing site 34 in a manner as illustrated in the electrical schematic diagram of FIGURE 8 embodying a synchronizing circuit for controlling the operation of the instrument of FIGURES 1 and 2. The circuit is energized by closing the on-off switch 200 which completes the circiut to a pair of terminals 201 adapted to be connected to the 60 cycle line mains. A first timer circiut 202 is energized to provide a means for periodically sequencing the movement of the turntable 10 while a second timer circiut 203 provides a means for cycling the pumps 36–40 and the probe 62. The timer circiuts 202 and 203, may by way of example, include a plurality of conventional motor driven cam operated switches. The timer circuit 202 includes a normally open switch 204 that is periodically closed at a rate depending upon the time duration (dwell period) for completing the mixing cycle or measurements. The switch 204 applies power to the turntable motor 24 for a sufficient time duration for the motor to rotate the gear 26 to close the normally open snap action switch 30.

The snap action switch energizes a relay $R_L$, a time delay relay $T_D$ and a counter circuit 205. The contacts of the relay $R_L$ and the time delay relay $T_D$ are, for purposes of convenience, designated by the same letters corresponding to the relays followed by a numeral designating a particular set of contacts. The normally open contacts $R_{L1}$ of the relay $R_L$ are connected in shunt with the cam operated switch 204 and keep the motor 24 energized until the turntable 10 has rotated sufficiently so that the gear 26 opens the snap action switch 30, at which time a new group of sample cups 18 and cuvetes 19 have rotated into the loading and sensing sites 32 and 34. The counting circuit 205 can for example be a stepping switch which counts the number of times the snap action switch 30 is closed to provide an indication when the first loaded cuvette 19 (including the test and reagent added in the loading site 32) has reached the sensing site 34 so that the pump 36 can be operated, when a complete cycle of operation is complete so that the pumps 38 and 40 do not pump liquid into cuvette 19 that was previously loaded and also when all the cuvettes 19 have reached the sensing site 34. The counter circuit 205 includes a switch 206 that is closed until a count has been reached indicating a complete revolution of the turntable 10, a switch 207 that closes when the first cuvette 19 loaded in the loading site 32 reaches the sensing site 34 (which in the present embodiment is a count of three) and a switch 208 that opens when all the cuvettes have been positioned in the sensing site 34. The time delay relay $T_D$ is energized each time the snap action switch 30 is closed and remains in the energized position for a short period after the switch 30 is opened. The time delay relay $T_D$ may for example be a pneumatic time delay relay.

The timer circuit 203 is connected in series with a normally open contact $T_{D1}$, normally closed contacts $R_{L2}$, and the counter switch 208 while the normally open contacts 209 of the timer circuit 203 are connected in shunt with the contacts $T_{D1}$ and $R_{L2}$. When the snap action switch 30 is closed so that the motor 24 rotates the turntable, both the time delay relay $T_D$ and the relay $R_L$ are energized so that the circuit to the timer circuit 203 remains open. When the snap action switch 30 is subsequently open, the relay $R_L$ and the time delay relay $T_D$ are de-energized, but the contacts of the time delay relay $T_{D1}$ remain closed for a short period of time so that timer circuit 203 is initially energized. When the timer circuit 203 is energized, the timer circuit switch 209 is closed and remains closed energizing the timer circuit until a mixing cycle is complete. The switch 208 remains closed until the counting circuit 205 registers a count corresponding to a rotation of the turntable 10 wherein all the cuvettes 19 have been positioned in the sensing site 34.

The motor 112 is connected in series with the counter switch 206 and the normally open contacts 210 of the timer circuit 203. The normally closed contacts of the snap action switch 118 are connected in shunt with the timer contacts 210. The motor 130 is connected in series with the counter switch 206 and the normally open contacts 211 of the timer circuit 203. The normally closed contacts of the snap action switch 136 are connected in shunt with the timer contacts 211. When the timer circuit 203 is energized, the contacts 210 are momentarily closed energizing the motor 112 which in turn drives the gear 108 so that the pin 114 disengages the snap action switch 118 closing the switch and keeping the motor 112 energized until the switch 118 engages the pin 115, at which time the probe 62 is positioned in a first operative position extending into a cup 18 in row 14. After a sufficient time duration for the probe 62 to reach a cup 18, the timer circuit 203 momentarily closes the switch 211 which energizes the pump motor 130. The motor 130 drives the gear 126 so that the pin 132 disengages the snap action switch 136, closing the switch until the pin 133 engages the snap action switch 136 completing one half revolution or cycle of operation. During this half of a cycle of operation the pump 38 withdraws a measured quantity of liquid test sample and while the pump 40 withdraws a measured quantity of liquid reagent from the reservoir 46.

After a sufficient time duration for the pumps 38 and 40 to complete the first half cycle of operation, the timer circuit 203 switch 210 is again momentarily closed, energizing the motor 112 so that the pin 115 is disengaged from the switch 118. The motor 112 continues to rotate until the pin 114 engages and opens the switch 118 positioning the probe 62 in the second operative position, i.e. over a cuvette 19 in the row 16. Shortly after the probe 62 is in its second operative position, the timer switch 211 is momentarily closed, energizing the pump motor 130 so that the pin 133 is disengaged from the switch 136. The pump motor 130 continues to rotate until the pin 132 engages the switch 136. During the second half of the cycle of operation, the pumps 38 and 40 deliver the withdrawn quantities of test sample and reagent into the cuvette 19 in the loading site 32. The counter switch 206 is opened when the turntable 10 has completed a cycle of revolution, i.e. all the cuvettes 19 have been loaded.

It should be noted, with the volume of test sample being small, the length of the tube 60 between the probe 62 and the connection to the tube 58 can be selected so that the entire measured quantity of test sample withdrawn is contained within this portion of the tube 60. Furthermore, the volume of reagent to be translated from the reservoir 46 can be greater than the quantity of test sample thereby effectively flushing the probe 62 with each cycle of operation thereby preventing the contamination of each test sample so mixed.

The pump motor 144 is connected in series with a normally open contact 212 of the timer circuit 203 and the normally open counter switch 207. The normally closed contacts of the snap action switch 150 are connected in shunt with the timer contacts 212. The counter switch 207 closes when the first loaded cuvette 19 reaches the sensing site 34, which in the present embodiment is a count of three. The timer circuit 203 switch 212 is momentarily closed each time a new cuvette 14 has been rotated into the sensing site 34, and energizes the pump motor 144 so that the pin 146 disengages from the snap action switch 150. The normally closed contacts of the snap action switch 150 keep the motor 144 energized for a cycle of operation, at which time the pin 146 engages the switch 150. For each cycle of operation, the connected pump 36 translates a measured quantity of reagent from the reservoir 44 into the cuvette 19 in the sensing site 34.

In summary, when the probe 62 is in the first operative position (inserted into a cup 18) a preset volume of test sample is withdrawn by the pump 38 while a preset volume of reagent is pumped from the reservoirs 44 and 46 into the pumps 36 and 40 respectively. When the probe is subsequently positioned in the second operative position (over the corresponding curvette 19 in the loading site 32) the preset volumes of reagent in pump 40 and the test sample in the pump 38 are pumped into the curvette 19 while a simultaneously preset volume of a second reagent is pumped from the pump 36 into the curvette 19 in the sensing site 34.

The automatic mixing system as illustrated in the figures is particularly adapted for automatically mixing the reagents required to set up chemical reactions for determing enzyme concentration in samples blood serum as described in an article by Henry et al. in the "American Journal of Clinical Pathology," vol. 34, No. 4, October 1960, pp. 381–398. The article describes a method of of entering such enzymes into reversible chemical reactions wherein the enzymes act as catalysts to aid the oxidization of a reduced form of nicotinamide-adenine dinucleotide (reduced NAD) to NAD or reverse. The concentration of enzymes is determined by the response of the chemical reaction to applied radiation. For example, reduced NAD is highly absorbent to radiation in the order of 340 nanometers while NAD is transparent. By adding an excess of reduced NAD or NAD (depending upon the species of enzymes being analyzed), the change in radiation absorption observed in the initial reaction is linear with time and directly proportional to the concentration of liquid. A method of measuring the kinetic reaction rate of such a reaction is set forth in a copending application Ser. No. 529,678, filed Feb. 24, 1966, wherein the inventor of the present application is a co-inventor and the application is assigned to the present assignee.

If the blood samples are to be tested for lactate dehydrogenase (LDH) enzymes, reduced NAD is pumped from the reservoir 46 along with the blood sample from the cup 18 into the cuvette 19 in the loading site 32. The mixture is so mixed (before being cycled into the sensing site 34) to incubate the mixture so that any chemical reaction due to residual chemicals is substantially spend before the mixture is cycled into the sensing site 34. The curvettes 19 extended into a toroidal shaped container 159 that is adapted to include a controlled temperature water bath to maintain the temperature of the mixture constant. When the mixture reaches the sensing site 34 a preset volume of pyruvic acid is pumped from the reservoir 44 into the curvette initiating the chemical reaction to be observed. Other enzymes such as glutamic pyruvic transaminase, or glutamicoxylacetic transaminase can be tested in a similar manner by substituting other reagents as set forth by Henry et al.

Since the reagents change with the type of enzyme being analyzed, fluid in the reservoirs, the plumbing, the pumps must be changed accordingly. With the prior art fluid mixing apparatus, this generally requires a considerable period of instrument down time so that the pumps, reservoirs, plumbing, etc. are thoroughly flushed and cleaned and the new reagents added. This problem has been overcome by the present invention by mounting the pumps 36–40 and the reservoirs 44 and 46 on the single detachable base 42 and detachably mounting the probes 62 and 67 on the arm 84 and the bracket 71 respectively so that the pump, reservoir, plumbing and probes can be removed as a moving unit (as illustrated in FIGURE 6) and allow the substitution of another unit.

The mixing unit base 42 includes a pair of guide pins 160 and 162 (FIGURES 1 and 2) extending therefrom to fit into a pair of guide holes in the base 43 (FIGURES 1 and 2). The base 42 also includes a triangular shaped extended portion 168 (FIGURES 2 and 6) that fits in a similarly shaped slot in the base 43 and a slot 164 (FIGURE 6) for receiving a guide pin 170 (FIGURE 2) formed as a portion of the base 43. A spring 166 (FIGURE 2) is mounted to engage the bases 42 and 43 to remove any clack in the fit. The entire assembly is removed by sliding the base 42 away from the turntable 10 thus disengaging the triangular portion 168 which then can be lifted free and slide forward disengaging pins 160 and 162 from their slots, and by detaching the probes 62 and 67. Another mixing unit can be substituted for the one removed by reversing the procedure.

The pumps 36–40 include adjustment means so that they can be precalibrated to translate a preset volume of fluid before mounting on the instrument. The FIGURE 7 is an exploded view of one of the pumps. The pumps include a graduated syringe barrel 180 adapted to receive a liquid being translated. A plunger 182 including an O-ring 186 extends through a threaded coupler 184 into the syring barrel 180 and functions as a piston. The threaded coupler 184 screws into the pump base 188 so that the syringe barrel 180 is mounted in place by the threaded cap 190 that also is adapted to make threaded engagement with the coupler 184.

A spring 192 surrounds a portion of the plunger 182 and when assembled provides a resilient urging action between the coupler 184 and a washer 193 adapted to engage an enlarged portion 194 of the plunger 182. An adjustable bearing 196 including a threaded portion 198 is adapted to be screwed into opposite end of the pump base 188 (opposite that of the coupler 184) to provide a bearing for the enlarged portion 194 of plunger 182 and an adjustment to preset the volume of liquid to be translated by the pump. The adjustable bearing 196 includes a surface (not shown) that engages the washer 193 to control the amount of plunger 182 movement away from the syringe barrel 180 and therefore controls the volume of liquid that can be received and translated per cycle of pump operation.

From the foregoing description it can be seen that each of a plurality of such mixing units can be precalibrated to provide for translating the desired volumes of liquid to be mixed (by adjusting the bearing 196). While the instrument of FIGURES 1 and 2 is in operation, an extra mixing unit may be cleaned and loaded for another series of tests thereby requiring a minimum of instrument down time. Furthermore, the entire mixing assembly can be stored, prior to use, in a refrigerator to minimize reagent instability. For example, by refrigerating the mixing unit (including reagents) during periods between making the above mentioned enzyme tests, the growth in the reagents is reduced wherein the unit as preloaded can be used to make further tests, or if stored for a prolonged period of time (such as overnight) can simply be refilled without cleaning.

Although the mixing apparatus has been illustrated as including three pumps, it is to be understood that any number of pumps can be so mounted and connected as a readily detachable unit. Furthermore, it is to be understood the apparatus can also translate the plurality of liquids simultaneously into a single cuvette or a plurality of cuvettes by simply changing the connections of the various tubes.

I claim:
1. An apparatus for automatically mixing liquids comprising:
   a carrier including a plurality of first containers and a plurality of second containers;
   a transfer device movable into a first operative position with respect to said first containers for withdrawing therefrom at least a portion of a liquid present in said first containers and to a second operative position with respect to said second containerds for delivery of a liquid thereto;
   means for moving said carrier and said transfer device relative to each other for positioning said transfer device in said first and second operative positions with respect to each of said first and second containers in succession, at predetermined times with intervening dwell periods;
   pump means preadjusted to pump a predetermined volume of liquid per cycle of operation;
   reservoir means for supplying at least one mixing liquid;
   mounting means for mounting said pump means and said reservoir means to form an interchangeable modular unit;
   coupling means coupling said pump means to said reservoir means;
   mounting means providing a readily detachable mounting base for receiving said modular unit;
   coupling means for detachably coupling said pump means to said transfer device, and
   drive means for engaging said pump means when positioned in said mounting base operating said pump means during said dwell periods to take up a measured quantity of liquid from a first container when said transfer device is in said first operative position and delivering said liquid with a measured quantity of said mixing liquid by reverse flow to a second container when said transfer device is in said second operative position.

2. Apparatus as defined in claim 1 wherein said means detachably coupling said pump means to said transfer device includes:
   a probe coupled to said pump means and detachably mounted to said transfer device so that said probe is directed into a first container when said transfer device is in said first operative position for withdrawing a portion of said liquid therein and is subsequently directed with respect to a second container in said second operative position for delivery of said withdrawn liquid along with a measured quantity of liquid from said reservoir means to a second container.

3. Apparatus as defined in claim 2 wherein:
   said pump means includes a pair of preealibrated pumps for translating measured quantities of liquid per cycle of operation;
   including coupling means for coupling said pair of pumps to said reservoir means and said probe so that a measured volume of a liquid in a first container is received by said probe when said transfer device is in said first operative position and is delivered into a second container when said transfer device is in said second operative position followed by a measured volume of another liquid from said reservoir means.

4. Apparatus as defined in claim 1 wherein:
said carrier comprises a rotatable member mounted for rotation about a shaft and having said first and second plurality of containers mounted in first and second circular rows concentric with said shaft and in lateral relation with each other, and
wherein said moving means periodically moves said rotatable member so that a new set of first and second containers are successively positioned in a mixing site with respect to said transfer device.

5. Apparatus as defined in claim 4 wherein:
said coupling means includes a probe connected to said pump means by a flexible tube;
quick disconnect means on said transfer device for receiving said probe; and
said transfer device is movably mounted to insert said probe into and out of a first container in said first operative position and is movably mounted to move said probe from said first operative position to said second operative position above a second container for delivery of said liquids thereto.

6. In an apparatus for transferring a mixture of fluids into a sensing site including a carrier for holding a plurality of liquid test samples in a first circular row, and a plurality of cuvettes in a second circular row, and means for intermittently rotating said carrier with intervening dwell periods so that said cuvettes are sequentially positioned in said sensing site, apparatus for automatically inserting at least a portion of a sample liquid and at least one reagent in said cuvettes comprising:
a plurality of pumps for translating preset volumes of liquid in response to a cycle of operation;
reservoir means for including at least one liquid reagent therein;
a probe;
first means coupling a first one of said plurality of pumps to said probe for receiving and expelling a liquid through said probe;
second means coupling at least one of said plurality of pumps other than said first one to said reservoir means and said probe for receiving preset volumes reagent from said reservoir means during a portion of its cycles of operation and expelling said reagent through said probe during another portion of its cycle of operation;
means for mounting said plurality of pumps and said reservoir means so that said plurality of pumps, said reservoir, said probe, and said first and second coupling means form an interchangeable modular unit;
a base for mounting said carrier;
transfer means, including readily detachable means for holding said probe, movably mounted on said base adjacent said carrier for movement to a first operative position with respect to said first row for positioning said probe for withdrawing liquid samples therefrom and subsequently to a second position with respect to said second row for positioning said probe with respect to said cuvettes for delivering a liquid thereto;
means for moving said transfer means between said first and second operative positions during said dwell periods;
means providing a readily detachable mounting base for receiving said modular unit to said abovementioned base; and
drive means mounted on said base for engaging said plurality of pumps when positioned on said mounting base to cycle said pump to withdraw said test liquid when said transfer means is in said first operative position and deliver said test liquid with said reagent when said transfer means is in said second operative position.

7. Apparatus as defined in claim 6 wherein each of said plurality of pumps are adjustable to translate predetermined volumes of fluid so that said modular unit including said plurality of pumps, said reservoir means, said probe and said first and second means can be precalibrated for operation before positioning on said mounting base.

8. Apparatus as defined in claim 7 wherein:
said plurality of pumps comprises first, second and third pumps;
said reservoir means includes a pair of containers for receiving liquid reagents therein;
said first means includes tubing connecting said probe to said first pump;
said second means includes a two way valve connected to said second pump including an input port connected to one of said containers and an output port connected to said tubing in said first means; and
means coupling said third pump to said other of said pair of containers and an output position in said sensing site so that said third pump translates a preset volume of said reagent from said other container into a cuvette in said sensing site.

References Cited

UNITED STATES PATENTS

| | | | |
|---|---|---|---|
| 3,081,158 | 3/1963 | Winter | 23—253 |
| 3,178,266 | 4/1965 | Anthon | 23—259 XR |
| 3,188,181 | 6/1965 | Peterson et al. | 23—253 XR |

MORRIS O. WOLK, *Primary Examiner.*

R. M. REESE, *Assistant Examiner.*

U.S. Cl. X.R.

141—130; 195—103.5, 127